Oct. 15, 1963  F. R. DIXON ET AL  3,107,284
HEAT TREATMENT OR BAKING OVENS
Filed July 22, 1960  3 Sheets-Sheet 1
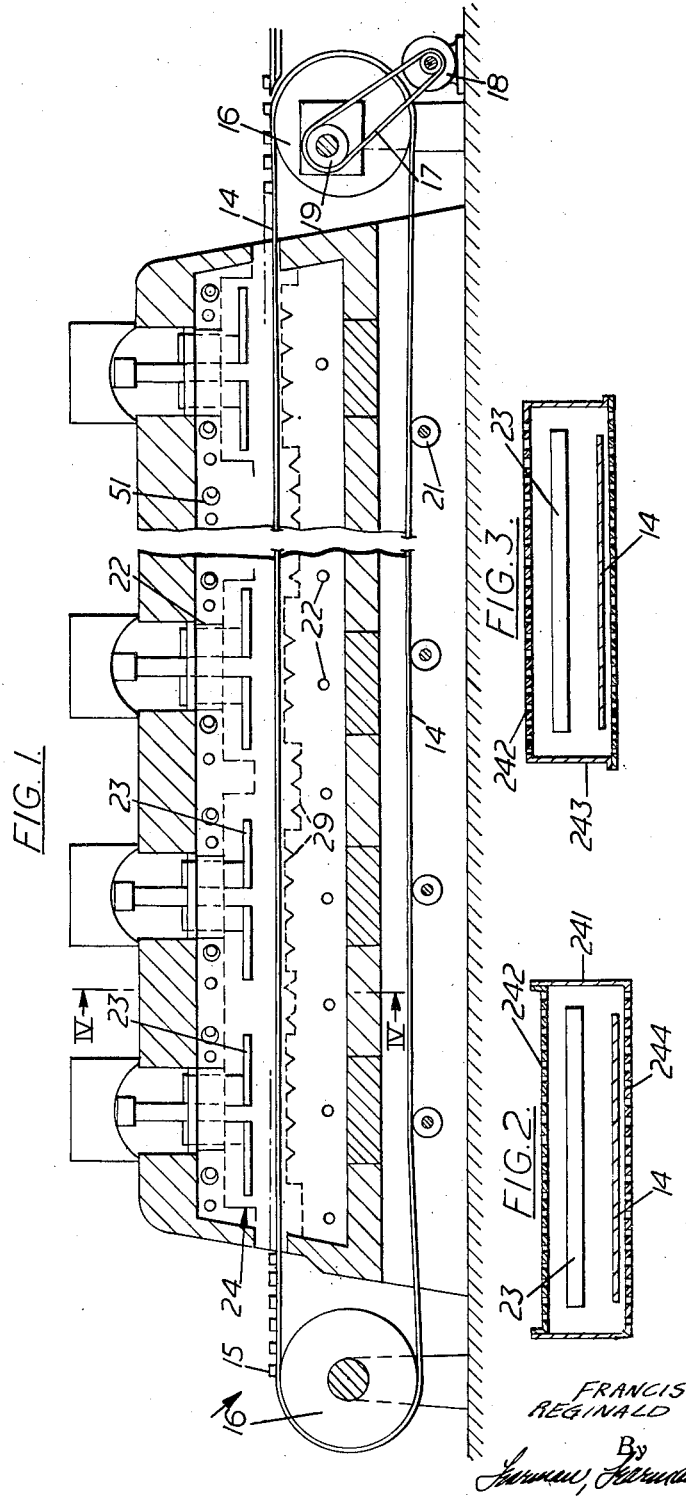
Inventor
FRANCIS R. DIXON
REGINALD G. CLEMENTS
By
Attorney

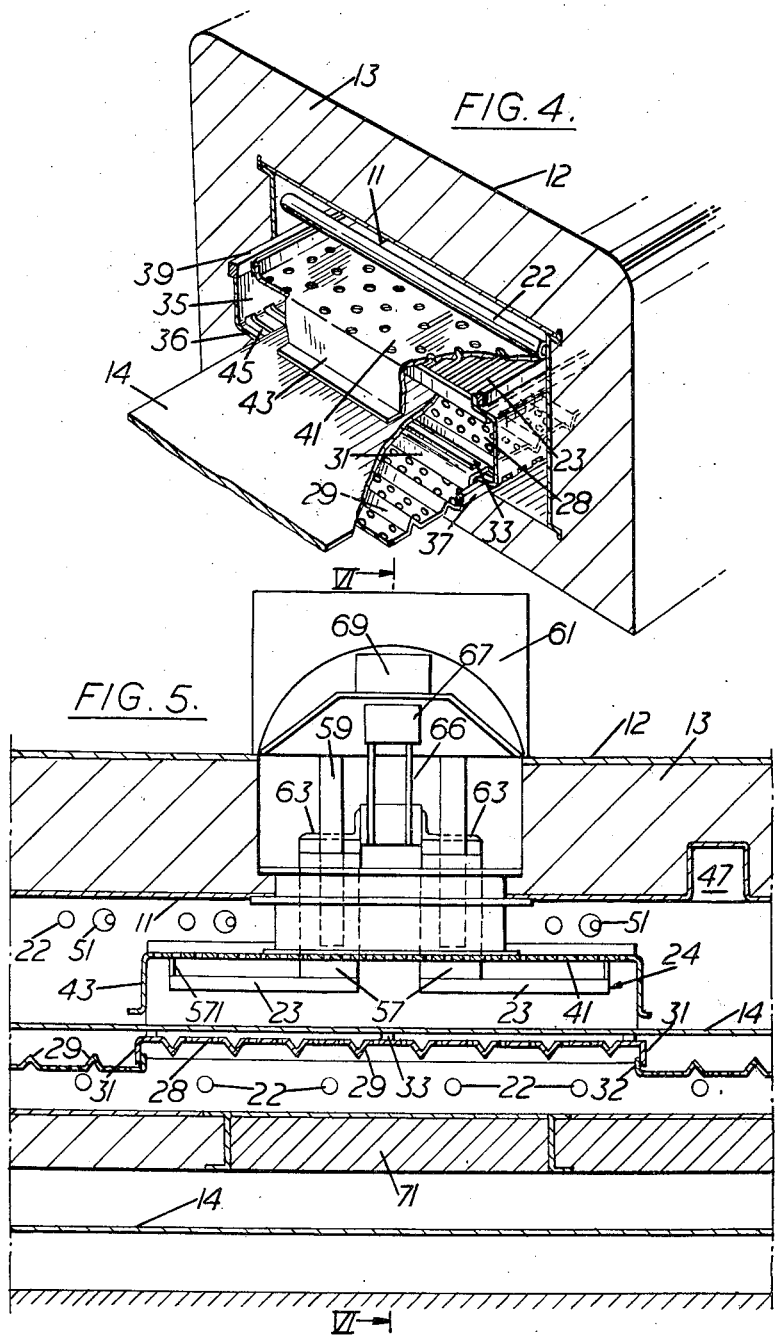

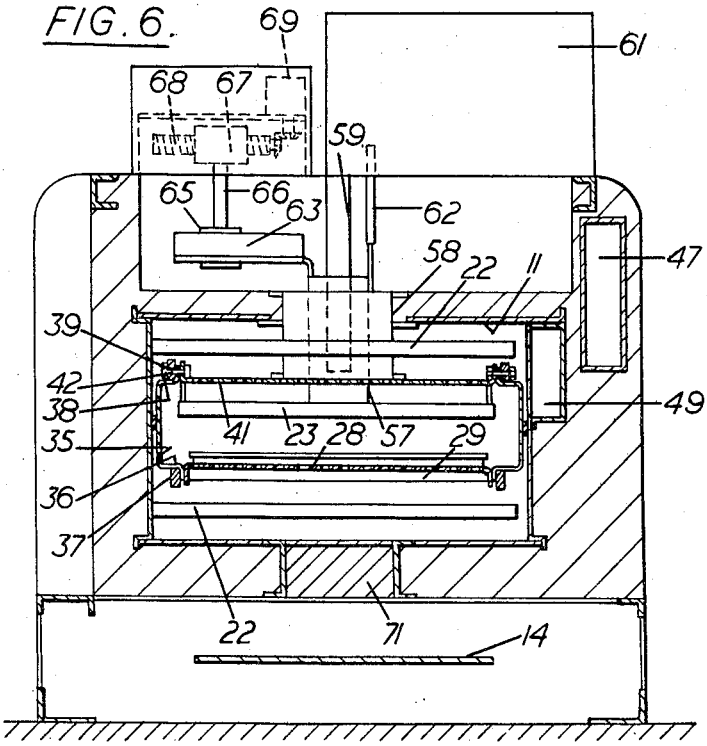
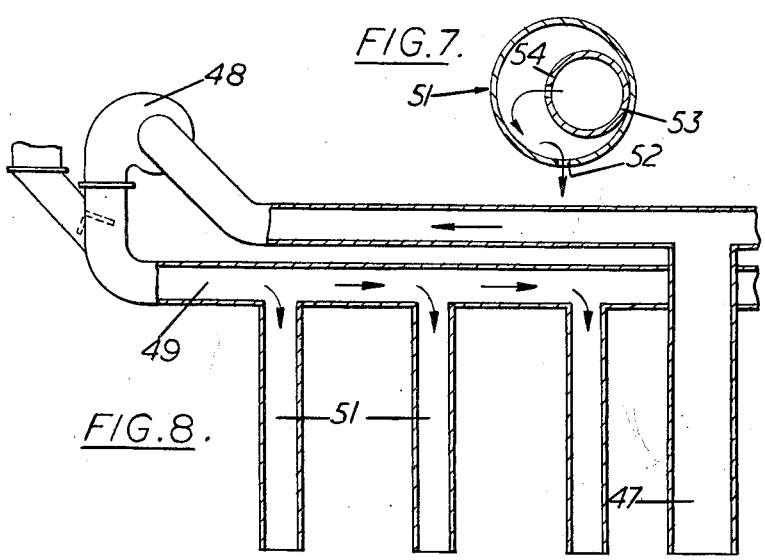

United States Patent Office 3,107,284
Patented Oct. 15, 1963

3,107,284
HEAT TREATMENT OR BAKING OVENS
Francis R. Dixon, Peterborough, and Reginald G. Clements, London, England, assignors to Baker Perkins Inc.
Filed July 22, 1960, Ser. No. 44,768
Claims priority, application Great Britain July 23, 1959
9 Claims. (Cl. 219—10.47)

The present invention relates to heat treatment or baking ovens for various types of articles which are caused to travel through the oven on suitable conveyor or carrier means, being subjected in the course of travel through the oven to treatment at a predetermined temperature or to predetermined temperatures so as to obtain the required heat treatment or baking thereof.

The features of the present invention may be applied to the baking or roasting of various articles including foodstuffs such as flour confectionery, biscuits or the like or also to other articles such as foundry cores.

As commonly constructed such continuous ovens or tunnel ovens which for many purposes must be of considerable length to obtain proper results, are heated by heating means operating with a direct action, such as gas burners or electric radiant heaters, hot air radiators or other heaters. Dielectric heating systems are of course known wherein the articles are passed through the field produced by one or more electrodes connected to a high frequency source. In such cases the system based on the use of two balanced electrodes is to be preferred, the two electrodes being placed side by side preferably in the same plane, and lying adjacent the path travelled by the articles so that the latter are heated by the fields between the two electrodes and the common "earth" electrode which may be the means conveying the article. Dielectric heating alone has not however proved satisfactory in all respects for heat treatment or baking ovens for articles of the character above referred to. For example, in the case of flour confectionery, such as biscuits, the usual crisp outer surface is not obtained. The inside of the article is brown while the outside is still white; further the articles tend to bake to a bulbous form. An oven of economical construction can be obtained and the length of the oven, and thus the cost can be reduced if direct heating means and dielectric heating means are combined in one oven, and the present invention has for its primary object to provide features applicable to a heat treatment or baking oven of this character.

In the design of an oven employing dielectric heating, care must be taken to minimise losses due to space currents traversing the metal work of the oven, which for economic reasons must generally be formed of steel, and these losses are due in part to the relatively low conductivity of steel and in part to its magnetic properties. If direct heating means of conventional character are employed as well as dielectric heating there are additional difficulties due to the need to accommodate the conventional heating elements and to the relatively high temperature which may be encountered, while still maintaining the said losses at a tolerable figure.

In accordance with the present invention a continuous heating or baking oven comprises direct or conventional heater means and dielectric heating means extending over a sectional portion of the oven and said portion comprises an inner tunnel through which a conveyor for the articles travels, said tunnel serving to house one or more pairs of balanced electrodes receiving high frequency current for heating the articles, and in which said tunnel is formed of one or more non-magnetic metals chosen or arranged so as to have the maximum possible electrical conductivity coupled with the ability to withstand the action of the direct heating means employed.

By this arrangement the tunnel forms a relatively low loss path for induced currents which flow substantially wholly through the walls thereof rather than through the other metal parts surrounding the tunnel, which in itself may be regarded as comprising the oven proper, in that the articles are traversed through the space within it and are there heated, partly by the action of the direct heating means and partly by the pairs of electrodes supported within the tunnel.

For constructional reasons part of said tunnel may have to be formed of a relatively heat resistant non-magnetic material, preferably a ferrous material such as a suitable grade of stainless steel, particularly for the parts thereof subjected to the highest temperatures by the conventional heating means or for the parts requiring substantial wear resistance or strength. Such a heat resistant material may not have as low a resistance as would be desirable but since the rest of the tunnel may be formed of non-ferrous metals of relatively high electrical conductivity such as aluminium, brass or bronze, an acceptable compromise can be obtained. By reducing the proportion of ferrous material to the minimum, for example, by using such material for the base of the tunnel only, while the rest of the tunnel is formed by non-ferrous material of relatively higher conductivity, such as aluminium or brass, or by avoiding the use of ferrous material altogether (which is possible under certain conditions), losses as a result of the current induced in said tunnel from the dielectric heating electrodes, can be reduced to a tolerable value and thereby an oven or a section of an oven is obtained in which the heating of the articles being treated is effectively obtained, partly by the direct heating means employed and partly by dielectric heating. It should be noted that copper, which would be desirable owing to its high conductivity, cannot generally be employed, as it is liable to oxidation by the action of the direct heating means. In some cases it may be possible to provide a suitable metal with a covering or skin of a more highly conductive metal. This may be a thin plating, e.g., of silver, or a multiple layer sheet of different metals can be used, the different layers being bonded or welded together in manufacture or the tunnel walls being assembled from several superposed sheets.

In one construction of ovens according to the present invention the articles being treated are carried by an endless conveyor band, which is caused to travel through the inner tunnel and may conveniently be supported from the floor thereof, said band being either an imperforate metal band or a wire mesh (woven or articulated type) or perforated band. An advantageous feature is that this band may consist of ordinary (magnetisable) carbon steel.

The tunnel is suitably supported within an oven structure which may embody inner and outer casings with suitable heat insulation material between them. Direct or conventional heating means such as gas burners are provided above and below the tunnel and conveniently the top wall of the tunnel is provided with a number of apertures so that radiant heat from the burners above the tunner may be thrown downwardly on the articles carried through the tunnel on the conveyor belt. The balanced electrodes, of which several pairs may be employed, are arranged within the tunnel, and are preferably carried by the oven structure.

Preferably the tunnel is of rectangular cross-section and the base section is formed from stainless steel sheet while the upper part of the tunnel is formed of aluminium or aluminium alloy sheet. In one form of the invention the upper part of the tunnel is formed either from one piece or from several pieces of aluminium sheet, consisting for example of side walls and a top wall suitably fixed together, or alternatively the base member of the tunnel may have upstanding integral or attached side walls, thus forming what may be termed a trough, said trough being covered by a suitable, preferably removable, flat cover sheet.

In this latter arrangement the bottom of the trough and the associated side walls may also be formed of stainless steel or of brass, bronze or other suitable relatively highly conductive metal while the top wall may be formed from aluminium sheet. In either arrangement the band is supported by the floor of the tunnel, in direct contact either with the floor or with skids secured to the floor of the tunnel.

With this arrangement the articles under treatment are sufficiently heated by the direct heating means above and below the tunnel and additionally dielectric heating is applied to the articles by the electrodes of the dielectric heating system. Stray currents are concentrated in the inner tunnel, which being formed for the most part at least of relatively highly conductive metal, do not involve unduly high electrical losses and consequently efficient dielectric heating is imparted to the articles without undue energy losses, moreover the tunnel serves as a screen preventing radiation of high frequency currents from the oven and also preventing currents being induced into the oven structure which is formed in the normal way of constructional steel or other suitable materials.

One construction of baking oven according to the present invention suitable for flour confectionery is shown by way of example on the accompanying drawings wherein:

FIG. 1 is a general diagrammatic view of the oven in longitudinal section incorporating four separate sets of dielectric heating means, FIGS. 2 and 3 illustrate diagrammatically two alternative forms of the inner tunnel structures, FIG. 4 is a perspective view as seen in section on the line IV—IV in FIG. 1, FIG. 5 is a view of one embodiment as seen in longitudinal section along the axis of the oven extending over the portion comprising an inner tunnel section, FIG. 6 is a cross-section on the line VI—VI of FIG. 5, FIG. 7 is a detail view showing the arrangement of air feeder ducts within the oven, and FIG. 8 illustrates the ducting arrangements for withdrawing air from the oven and delivering it to the feeder ducts shown in FIG. 7.

The oven according to the invention as shown in generalised form in FIG. 1 comprises an elongated oven structure, which may be formed of several sections assembled in axial alignment. The oven casing comprises inner and outer walls 11, 12 with heat insulating and resisting material 13 located between them. These parts form a tunnel oven through which an endless coneyvor belt 14 is caused to pass, the upper run of said belt forming a substantially horizontal conveying surface for articles 15 to be treated, which are fed on to the belt at one end as indicated on the left-hand side of FIG. 1 and are thereby conveyed through the oven and are removed from the belt 14 at the other end. The belt 14 is supported at each end on support drums 16 at least one of which is power driven, for example by means of a belt 17 and driving motor 18 with a variable reduction gear box 19. The return run of the belt 14 travels over support rollers 21 located beneath the oven structure, which is supported clear of the ground.

It is an important feature of the present invention that there is located within the oven chamber traversed by the belt 14 a series of direct or conventional heating means represented at 22 and located both above and below the conveyor belt 14. These heating means are of the kind operating by direct heat transfer and will for convenience hereinafter be termed the "direct heating means." They may consist of electric heating units or they may consist of gas burners.

The present inevntion further provides one or more groups of dielectric heating means which in each case include electrode means 23 located within an inner tunnel 24 through which the conveyor belt 14 is passed. The said dielectric heating means provide additional heating of the articles 15 and ensure the optimum heat treatment of such articles in conjunction with the direct heating obtained by the means represented at 22.

The positioning of the dielectric heating means within the oven may be selected according to the arrangement of the oven and of the articles under treatment so as to obtain the desired heat treatment of the articles 15, and in some cases the heating units may be uniformly distributed along the length of the oven structure 11, 12, 13. In other cases a single dielectric heater means 23 and tunnel 24 may be used or there may be a number of such heating units arranged towards one end of the oven as indicated on FIG. 1, and this may then be followed by a section not provided with dielectric heating units, while there may be a further dielectric heating unit or units towards the other end of the oven. In general, however, the direct heating means 22 will be arranged uniformly or irregularly throughout the length of the oven. An arrangement of this kind has proved to be particularly suitable for the baking of flour confectionery and it is to be understood that the detail features shown on the accompanying drawings are particularly suitable for the treatment of such products but naturally the construction and detail arrangement of the oven may be varied according to the nature of the products being treated.

It will be seen from FIG. 1 and in greater detail on the other drawings, that the conveyor belt 14 is caused to travel through a tunnel oven formed by the inner and outer casing sections 11, 12 and that such tunnel oven is provided with dielectric heating means incorporating balanced electrodes 23 which are located within an inner tunnel section 24 which embraces and encloses the electrodes 23 and provides a tunnel-like space through which the conveyor belt 14 is caused to pass, while resting on the lower wall of the inner tunnel. The purpose of the inner tunnel sections 24 is to form a relatively low loss path for space currents engendered by the high frequency power current applied to the electrodes 23 and the inner tunnel sections 24 are designed primarily with this requirement in mind, but allowing for the comparatively high temperatures which may be encountered due to the presence of the direct heating means represented by the heating means 22, and various constructions of the tunnel may be adopted according to the temperatures which must be encountered. Fundamentally the tunnel 24 may be formed by a U-shaped trough member 241 as shown in FIG. 2, which is closed towards the top by means of a cover plate 242. Alternatively, an inverted trough-shaped member 243 may be used as shown in FIG. 3 which is closed at the base by means of a cover or soleplate 244.

In order to provide the low loss path for the space currents, all the parts of the tunnel are formed of non-magnetic material of the maximum possible electrical conductivity, but nevertheless capable of withstanding the comparatively high temperatures which may be involved. Since, however, the conveyor belt 14 will generally rest upon and be supported by the soleplate or base of the inner tunnel, this part at least may have to be formed of a material which is not unduly affected by the high temperatures, and for this purpose it may in many cases be necessary to utilise stainless steel for the base or soleplate while the remainder of the tunnel structure may be formed of non-ferrous relatively highly conductive materials such as aluminium, brass or bronze, which, however, must be unaffected by the comparatively high temperatures within the outer oven. Thus, for example, in the case of FIG. 2 the trough member 241 could be formed of stainless steel while the cover plate 242 could be formed of aluminium, brass or bronze. Likewise, in the case of FIG. 3 the soleplate 244 could be formed of stainless steel while the inverted U-shaped cover member 243 could be formed of aluminium, brass or bronze.

The foregoing general description relates more particularly to the broad principles involved in the design of an oven according to the present invention, while FIGS. 4 to 8 represent preferred constructional details of one embodiment of an oven. In this preferred construction there is provided a soleplate 28 (shown also in FIG. 1) extending throughout the oven from end to end and which is formed of several sections of stainless steel and several of mild steel, all said sections being provided with comparatively deep V-shaped corrugations 29 to give adequate strength; each of said sections is suitably supported from the base or from the side walls of the oven, the mounting means involved comprising fastening bolts cooperating with slots in the soleplate sections to permit the requisite small degree of expansion and contraction of the soleplate sections. It will be seen in generalised form in FIG. 1 and in detail in FIG. 5 that the dielectric heating elements 23 are enclosed by tunnel sections 24, the base of which is formed by a part of the soleplate 28 having down-turned end flange portions 31. Over this section the soleplate 28 is provided with downwardly directed corrugations 29 whereas the portion of the soleplate 28, which is usually of mild steel extending between adjacent pairs of inner tunnel sections 24 lies at a lower level and is provided with upturned end flanges 32 adjacent to the flanges 31 and over these intermediate sections the V-shaped corrugations 29 point upwardly. The conveyor belt 14 rests upon skids or slats 33 which provide wear-absorbing surfaces for the conveyor belt. Where there is a considerable length of oven at the lower level separate skids of well-known type are provided over said length.

As stated, the soleplate 28 is conveniently formed of stainless steel so as to provide a relatively low-loss path for space currents from the balanced electrodes 23, and the corrugations 29 give sufficient strength to prevent distortion under the action of the direct heating from the means 22, which in this embodiment preferably consist of gas heaters; the means 22 then comprising burners extending from one side wall of the oven and suitably controlled in accordance with techniques well-known in this art, from a suitable control panel on one side of the oven.

The side edges of the soleplate selections 28 are flanged downwardly as shown at 34 in FIG. 6, and are there engaged by side wall components 35 of the inner tunnel of thin flexible metal, said side wall components having a vertical portion lying in close contact with the inner casing 11 and clamped or otherwise fixed or connected electrically to the inner wall so as to provide efficient earthing. The side wall components 35 are provided with a bottom horizontally directed section 36 which is flanged downwardly at its edge adjoining the flange 34 of the soleplate 28 and is supported at this point by a flat strip 37 conveniently of stainless steel. At its upper end the side member 35 is bent inwardly as shown at 38 and then flanged upwardly to engage the side face of an aluminium support strip 39 the strips 37 and 39 extending for the whole length of the inner tunnel section to provide a strong and rigid assembly. The top wall of the tunnel so formed is provided by a perforated cover plate 41 having a flanged side edge 42 which nips the flanged edge of the part 38 of side wall 35 against the support strip 39. Flexing of member 35 permits expansive and contractive changes in the plates 28 and 41.

The front and rear ends of the tunnel sections 24 are provided with depending lip portions 43 which serve to enclose the boundaries of the space housing the balanced electrodes 23 and providing a comparatively narrow entrance slot (shown on a somewhat exaggerated scale in FIG. 4) to allow the movement of the conveyor belt 14 and of the articles under treatment carried thereby.

As best shown on FIG. 4 the soleplate 28 is perforated to permit even distribution of the heat to the conveyor belt 14 and to ensure an adequate convection current flow from the bottom burners 22, and likewise the cover plate 41 is perforated to permit radiant heat from the burners 22 above the inner tunnel to reach the articles carried on the conveyor belt 14. Likewise the electrodes 23 are of openwork slatted or grid-like construction to permit effective heating of the articles within the inner tunnel zones to be maintained.

With a view to avoiding excessive local heating of the conveyor belt 14 near the side edges, which has been found by experience to be liable to occur with consequent danger of distortion of the belt 14, the horizontal sections 36 of the inner tunnel side wall members 35 may be perforated or slotted as shown at 45 adjacent their point of lodgement upon the strip 37, and it has been found by experience that the proper proportioning and placing of these perforations or slots 45 avoids distortion of the belt 14.

The requirements of strength at high temperature and for providing a low-loss path around the electrodes 23 are ensured by the fact that the soleplate 28, at least for the sections thereof lying beneath the electrodes 23, is formed from a non-magnetic stainless steel, while the remainder of the inner tunnel comprising the parts 35, 36, 38 and 41 are formed of aluminium, brass or bronze. It thus becomes possible to impart a very large amount of radio frequency power to the articles under treatment from the electrodes 23 without excessive losses being encountered in the metalwork surrounding the electrodes and to prevent space currents from passing through the casing members 11, 12 forming the main body of the oven.

Experience has shown that it is desirable to maintain a certain measure of turbulence within the oven casing, and for this purpose a certain amount of air is extracted from the oven casing through a duct 47 by the action of a fan 48 (FIG. 8) to deliver a large proportion of this air through ducts 49 to outlet pipes 51 distributed along the upper part of the oven the remainder being allowed to pass away to a flue. These delivery pipes are conveniently arranged as shown in FIG. 7 from which it will be seen that an outer delivery pipe is provided with outlets 52 along its base edge and there is provided within the outer pipe a feed pipe 53 in communication with the delivery ducts 49 and having horizontally directed outlets 54 so that the outgoing air is caused to expand into the outer casing while moving in the horizontal direction and is then delivered in the downward direction from the outer casing; this ensures a high measure of turbulence within the outer oven.

The electrodes 23 are supported centrally of one side by tubular support members 57, conveniently of square section, and of high conductivity metal such as aluminum arranged side by side in a vertical support casing 58 fixed and electrically bonded to the inner and outer oven casings 11 and 12 by suitable flanges as shown, said support casing being carried downwardly to act as a partial support for the top wall 41 of the inner tunnel section which is also supported from inner casing 11 in such a way that expansive and contractive changes in a horizontal plane can take place. The support members 57 are themselves traversed by pipes 59 of suitable insulating material receiving cooling air from a suitable source, thus preventing overheating of the support members 57. Two other supports 571 may be provided for each electrode at or near the corners remote from 57; they may be of insulating material and supported from the inner casing 11. The electrodes 23 receive high frequency power from an oscillator and power unit indicated in conventional outline form at 61 and as such unit is constructed in accordance with normal practice in this art it has not been thought necessary to show the details thereof. The oscillator unit embodies a cooling air system and a cooling water system, which also are not shown. Such cooling air system feeding the cooling pipes 59 traversing the support members 57 for the electrodes 23. The output from the oscillator 61 is coupled to an output loop 62 in accordance with normal practice and is thereby fed to the tuner and by support members 57 to the electrodes 23.

A tuning unit is provided to secure optimum load matching and to permit a relatively small tuning adjustment for the purpose of securing maximum transfer of high frequency energy from the electrodes 23 to the articles 15 being carried on the conveyor belt 14, such tuning unit being adjustable from the outside of the oven in order to permit any slight adjustments to be readily effected. The top ends of the tubular support members 57 carry angle members 63 of which are extended horizontally, one parallel to the other as shown on FIG. 6. The two angle members 63 thus form a tuning stub and co-operate with a shorting bar 65 either in electrical contact with the members 63 or positioned so close thereto as to be an effective short circuit for high frequency currents. The shorting bar 65 is carried by arms 66 of suitable insulating material and means are provided to effect effective displacement of the shorting bar 65 lengthwise of the members 63 so as to vary the tuning of the electrode system. Various means may be provided for effecting such displacement, for example the arms 66 may be carried by a threaded member 67 engaged by a screw spindle 68 in turn driven by means of a drive unit 69 which may be either power or hand-operated so as to impart the required displacement to the shorting bar 65.

The lower wall of the outer oven may be formed with access openings located beneath the pairs of balanced electrodes 23, said openings being filled by means of a door or filler 71 which is preferably arranged to serve as an explosion relief door to prevent damage to the oven structure in the event of an explosion occurring inside the oven. Such an explosion relief door or cover may be held in position by releasable means such as shear pins which serve to retain the door in position under normal operating conditions but allow the door to be readily removed when required and permit it to be forced out as a result of an internal explosion.

What we claim is:

1. A continuous oven comprising an elongated horizontal outer casing having spaced upper and lower walls, an endless conveyor belt the upper run of which travels continuously through said elongated casing, a soleplate in said casing to provide a support for said endless conveyor belt, the upper surface of which provides a horizontal support surface for articles to be treated, an inner tunnel section formed in part by a sectional length portion of said soleplate and by side and top walls bonded to the soleplate, balanced high frequency electrodes disposed within said inner tunnel section and extending horizontally above and spaced from the upper surface of the conveyor belt, said inner tunnel section being formed from non-magnetic materials to provide a comparatively low-loss path for space currents to minimise loss of heat, means supporting said electrodes from the outer oven casing, direct heater means distributed evenly throughout the length of the oven casing beneath the soleplate, further direct heating means distributed along the upper portion of the oven above the conveyor belt, certain of said direct heating means lying above and below the inner tunnel section and means to supply high frequency power to said balanced electrodes, said soleplate comprising a series of perforated sections strengthened by means of deep V-shaped corrugations, that section pertaining to and forming part of an inner tunnel section being formed of stainless steel and having the V-shaped corrugations pointing away from the conveyor belt and further incorporating facial ribs upon which the conveyor belt rests while traversing the inner tunnel section formed in part by said soleplate section, and said inner tunnel being completed by side wall portions bonded to the side walls of the outer oven casing and by a perforated top wall, the perforations in the soleplate permitting transfer of heat from the direct heating means beneath the soleplate to the conveyor belt while the perforations in the top wall permit radiant heat to be transmitted to the upper surface of the conveyor belt.

2. A continuous oven according to claim 1 further comprising a tuning unit associated with the energy transfer path to the electrodes, said tuning unit including a tuning stub consisting of parallel conductor strips and a displaceable shorting bar movable along said strips for tuning purposes, said tuning means being variably operable from externally of the oven to secure optimum energy transfer according to the articles under treatment.

3. A continuous oven comprising an outer oven casing of walls forming an elongated tunnel-like formation, an endless conveyor belt the upper run of which is adapted to be traversed through the casing, the return run extending beneath said casing, a plurality of inner tunnel sections within said outer casing together occupying less than the whole length of the oven and through each of which said upper run passes, each said inner tunnel section comprising a bottom wall, side walls and a top wall to provide a tunnel-like member, pairs of balanced electrodes located in said tunnel-like member and electrically screened thereby so that space currents are concentrated in said tunnel-like portions, said tunnel-like portions being formed of non-magnetic materials selected for minimum electrical losses of said space currents, means to supply high frequency power currents to said pairs of electrodes to perform high frequency heating of articles carried on said conveyor belt, and gas heater devices positioned above and below said conveyor belt and distributed throughout the length of the outer oven so that baking of articles on said conveyor belt is performed partly by the action of said gas heater means and partly by dielectric heating from the high frequency power applied to said electrodes, the bottom members of all said inner tunnel sections being formed by portions of a soleplate extending from end to end of the oven, said soleplate having portions extending at a higher level which portions form the base portions of each tunnel section and other intermediate portions extending at a lower level, all said portions of the soleplate incorporating V-shaped corrugations and being apertured to allow heating of the conveyor belt by the gas heater means located beneath said soleplate.

4. An oven construction comprising top, bottom and side walls joined to one another to form an outer casing; conveyor means extending through said casing and adapted to carry articles to be treated in said oven; a tunnel member supported within said casing and having top, bottom and side walls joined to one another and spaced from the corresponding walls of said outer casing, said conveyor means extending through said tunnel and being supported by the bottom wall thereof; direct heating means supported by said casing internally of the latter and externally of said tunnel and adjacent at least one of the walls of said tunnel; high frequency heater means supported internally of said tunnel; and means for supplying said high frequency heater means with high frequency power, said walls of said tunnel being formed from relatively highly conductive, non-magnetic material to provide a low loss path for space currents.

5. The construction set forth in claim 4 wherein said one wall of said tunnel is perforate.

6. The construction set forth in claim 4 wherein said direct heating means are supported in said casing above and below said tunnel.

7. The construction set forth in claim 6 wherein the top and bottom walls of said tunnel are perforate.

8. The construction set forth in claim 4 including a skirt at each end of said tunnel extending from the top wall thereof toward said bottom wall of said tunnel but terminating short thereof to provide clearance for said conveyor means and any articles supported thereon.

9. The construction set forth in claim 4 wherein said bottom wall of said tunnel is formed of stainless steel and the remaining walls thereof are formed from the class of materials comprising aluminum, brass and bronze.

References Cited in the file of this patent

UNITED STATES PATENTS

| | | |
|---|---|---|
| 2,576,519 | Kopp | Nov. 27, 1951 |
| 2,597,825 | Schroeder | May 20, 1952 |
| 2,684,432 | Hopkins et al. | July 20, 1954 |
| 2,842,650 | Naylor et al. | July 8, 1958 |
| 2,908,234 | Naylor | Oct. 13, 1959 |